United States Patent
Lee et al.

(10) Patent No.: US 11,499,615 B2
(45) Date of Patent: Nov. 15, 2022

(54) COMPACT SPLIT TORQUE TRANSMISSION FOR WIDE OVERALL RATIO COVERAGE

(71) Applicant: GM Global Technology Operations LLC, Detroit, MI (US)

(72) Inventors: Chi Teck Lee, Novi, MI (US); Christopher M. Kaminski, Royal Oak, MI (US); Kirk L. Wirth, West Bloomfield, MI (US); Dan Coffey, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 17/036,438

(22) Filed: Sep. 29, 2020

(65) Prior Publication Data
US 2022/0099168 A1 Mar. 31, 2022

(51) Int. Cl.
| | |
|---|---|
| *F16H 47/04* | (2006.01) |
| *F16H 3/66* | (2006.01) |
| *B64C 27/14* | (2006.01) |
| *B64C 27/00* | (2006.01) |
| *F16H 37/08* | (2006.01) |

(52) U.S. Cl.
CPC ............ *F16H 47/04* (2013.01); *B64C 27/00* (2013.01); *B64C 27/14* (2013.01); *F16H 3/663* (2013.01); *F16H 2037/0886* (2013.01); *F16H 2200/2007* (2013.01); *F16H 2702/06* (2013.01)

(58) Field of Classification Search
CPC .................................... F16H 1/22; F16H 1/206
See application file for complete search history.

(56) References Cited

U.S. PATENT DOCUMENTS

| | | | | | |
|---|---|---|---|---|---|
| 1,514,522 | A | * | 11/1924 | Hilmes | F16H 1/222 475/220 |
| 5,896,775 | A | * | 4/1999 | Southcott | F16H 1/22 74/DIG. 10 |
| 7,244,210 | B2 | * | 7/2007 | Hamai | F16H 48/08 475/150 |
| 8,479,851 | B2 | * | 7/2013 | Mack | B60L 50/16 180/65.6 |

(Continued)

OTHER PUBLICATIONS

Abraham Segade-Robleda, José-Antonio Vilán-Vilán, Marcos Lopez-Lago and Enrique Casarejos-Ruiz (2012). Split Torque Gearboxes: Requirements, Performance and Applications, Mechanical Engineering, Dr. Murat Gokcek (Ed.), ISBN: 978-953-51-0505-3, InTech, Available from: http://www.intechopen.com/books/mechanical-engineering/split-torque-gearboxes-requirements-performanceand-applications.

(Continued)

*Primary Examiner* — Derek D Knight
(74) *Attorney, Agent, or Firm* — Vivacqua Crane PLLC

(57) ABSTRACT

An automobile vehicle split torque transmission includes an electrical motor having a rotor drive shaft with a drive pinion attached to the rotor drive shaft, the rotor drive shaft defining a first axis. A first transfer gear is mounted on a first transfer gear shaft defining a second axis, the first transfer gear meshed with the drive pinion. A second transfer gear is mounted on a second transfer gear shaft defining a third axis, the second transfer gear meshed with the drive pinion. A differential ring gear is supported on a differential shaft and rotates a differential assembly, the differential shaft defining a fourth axis.

13 Claims, 11 Drawing Sheets

(56) References Cited

U.S. PATENT DOCUMENTS

| | | | |
|---|---|---|---|
| 9,500,267 B2* | 11/2016 | Hederstad | B60K 6/48 |
| 10,781,887 B2* | 9/2020 | Green | F16H 1/206 |
| 11,293,534 B2* | 4/2022 | Downs | B60K 1/00 |

OTHER PUBLICATIONS

T.L.Krantz, M.Rashidi, and J.G. Kish. Split Torque Transmission Load Sharing. NASA Technical Memorandum. 1992. p. 1-24. National Aeronautics and Space Administration, Washington D.C.

* cited by examiner

COMPACT SPLIT TORQUE TRANSMISSION FOR WIDE OVERALL RATIO COVERAGE

INTRODUCTION

The present disclosure relates to single speed ratio transmissions for automobile vehicles including electrical vehicles.

Single speed ratio transmissions for automobile vehicles having an electrical motor for output propulsion are commonly used due to cost and weight. Single speed ratio transmissions commonly have a single drive gear extending from an electrical motor shaft, which engages an output gear, including an output pinion gear. Because all of the drive torque is delivered through a single set of output gears, transmission gear noise, as well as gear contact stresses and shaft bending stresses are difficult to eliminate and control. Transmission output efficiency is therefore often reduced.

Thus, while current single speed ratio transmissions for electrical vehicles achieve their intended purpose, there is a need for a new and improved single speed ratio transmission and method for operation.

SUMMARY

According to several aspects, an automobile vehicle split torque transmission includes an electrical motor having a rotor drive shaft with a drive pinion attached to the rotor drive shaft, the rotor drive shaft defining a first axis. A first transfer gear is mounted on a first transfer gear shaft defining a second axis, the first transfer gear meshed with the drive pinion. A second transfer gear is mounted on a second transfer gear shaft defining a third axis, the second transfer gear meshed with the drive pinion. A differential ring gear is supported on a differential shaft and rotates a differential, the differential shaft defining a fourth axis.

In another aspect of the present disclosure, a first final drive pinion is mounted on the first transfer gear shaft and co-rotates with the first transfer gear.

In another aspect of the present disclosure, a second final drive pinion is mounted on the second transfer gear shaft and co-rotates with the second transfer gear.

In another aspect of the present disclosure, the first final drive pinion and the second final drive pinion are independently meshed with the differential ring gear defining a final drive gear which rotates the differential.

In another aspect of the present disclosure, the drive pinion, the first transfer gear, the second transfer gear, the first final drive pinion, the second final drive pinion and the differential ring gear define helical gears.

In another aspect of the present disclosure, a first bearing supports the rotor drive shaft; and a second bearing supports the rotor drive shaft.

In another aspect of the present disclosure, a third bearing supports the first transfer gear shaft; a fourth bearing supports the first transfer gear shaft; a fifth bearing supports the second transfer gear shaft; and a sixth bearing supports the second transfer gear shaft.

In another aspect of the present disclosure, the first bearing, the third bearing and the fifth bearing define free bearings; and the second bearing, the fourth bearing and the sixth bearing define fixed bearings.

In another aspect of the present disclosure, a first spacing is defined between the second axis and the third axis; and a second spacing is defined between the first axis and the fourth axis. A total height of the split torque transmission is varied by one of: increasing the first spacing and decreasing the second spacing; or decreasing the first spacing and increasing the second spacing.

In another aspect of the present disclosure, the second axis is oriented parallel to the third axis.

According to several aspects, an automobile vehicle split torque transmission includes an electrical motor having a rotor drive shaft. A drive pinion is attached to the rotor drive shaft. A first transfer gear is mounted on a first transfer gear shaft, the first transfer gear meshed with the drive pinion. A second transfer gear is mounted on a second transfer gear shaft defining a third axis, the second transfer gear meshed with the drive pinion. A first final drive pinion is mounted on the first transfer gear shaft and co-rotates with the first transfer gear. A second final drive pinion is mounted on the second transfer gear shaft and co-rotates with the second transfer gear. A differential ring gear is supported on a differential shaft. The first final drive pinion and the second final drive pinion are independently meshed with the differential ring gear defining a final drive gear rotating a differential.

In another aspect of the present disclosure, the rotor drive shaft defines a first axis. The first transfer gear shaft defines a second axis. The second transfer gear shaft defines a third axis. The differential shaft defines a fourth axis. The second axis is positioned on a plane and the third axis is positioned on the plane, with the second axis oriented parallel to the third axis.

In another aspect of the present disclosure, the first axis, the second axis and the third axis are commonly positioned on a plane extending through a longitudinal central axis of the rotor drive shaft, a longitudinal central axis of the first transfer gear shaft and a longitudinal central axis of the second transfer gear shaft.

In another aspect of the present disclosure, a first distance segment and a second distance segment are equal length segments, the first distance segment defining a distance between a longitudinal central axis of the first transfer gear shaft and a longitudinal central axis of the rotor drive shaft, with the second distance segment defining a distance between a longitudinal central axis of the second transfer gear shaft and the longitudinal central axis of the rotor drive shaft.

In another aspect of the present disclosure, a third distance segment and a fourth distance segment are equal length segments, the third distance segment defining a distance between a longitudinal central axis of the differential shaft and a longitudinal central axis of the first transfer gear shaft, with the fourth distance segment defining a distance between the longitudinal central axis of the differential shaft and a longitudinal central axis of the second transfer gear shaft.

In another aspect of the present disclosure, each of the rotor drive shaft, the first transfer gear shaft, the second transfer gear shaft and the differential shaft are independently supported from a transmission housing using a first bearing and a second bearing for each shaft, one of the first bearing or the second bearing defining a fixed bearing and the other one of the first bearing or the second bearing defining a free bearing.

In another aspect of the present disclosure, the drive pinion, the first transfer gear, the second transfer gear, the first final drive pinion, the second final drive pinion and the differential ring gear define helical gears.

According to several aspects, a method for constructing an automobile vehicle split torque transmission comprises: connecting a rotor drive shaft to an electrical motor; attaching a drive pinion to the rotor drive shaft; mounting a first transfer gear on a first transfer gear shaft; meshing the first transfer gear with the drive pinion; fixing a second transfer gear on a second transfer gear shaft; meshing the second transfer gear with the drive pinion; and supporting a differential ring gear on a differential shaft acting to rotate a differential.

In another aspect of the present disclosure, the method further includes: mounting a first final drive pinion on the first transfer gear shaft to co-rotate with the first transfer gear; mounting a second final drive pinion on the second transfer gear shaft to co-rotate with the second transfer gear; and independently meshing the first final drive pinion and the second final drive pinion with the differential ring gear defining a final drive gear to rotate the differential.

In another aspect of the present disclosure, the method further includes independently supporting each of the rotor drive shaft, the first transfer gear shaft, the second transfer gear shaft and the differential shaft from a transmission housing using a first bearing and a second bearing, one of the first bearing or the second bearing defining a fixed bearing and the other one of the first bearing or the second bearing defining a free bearing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
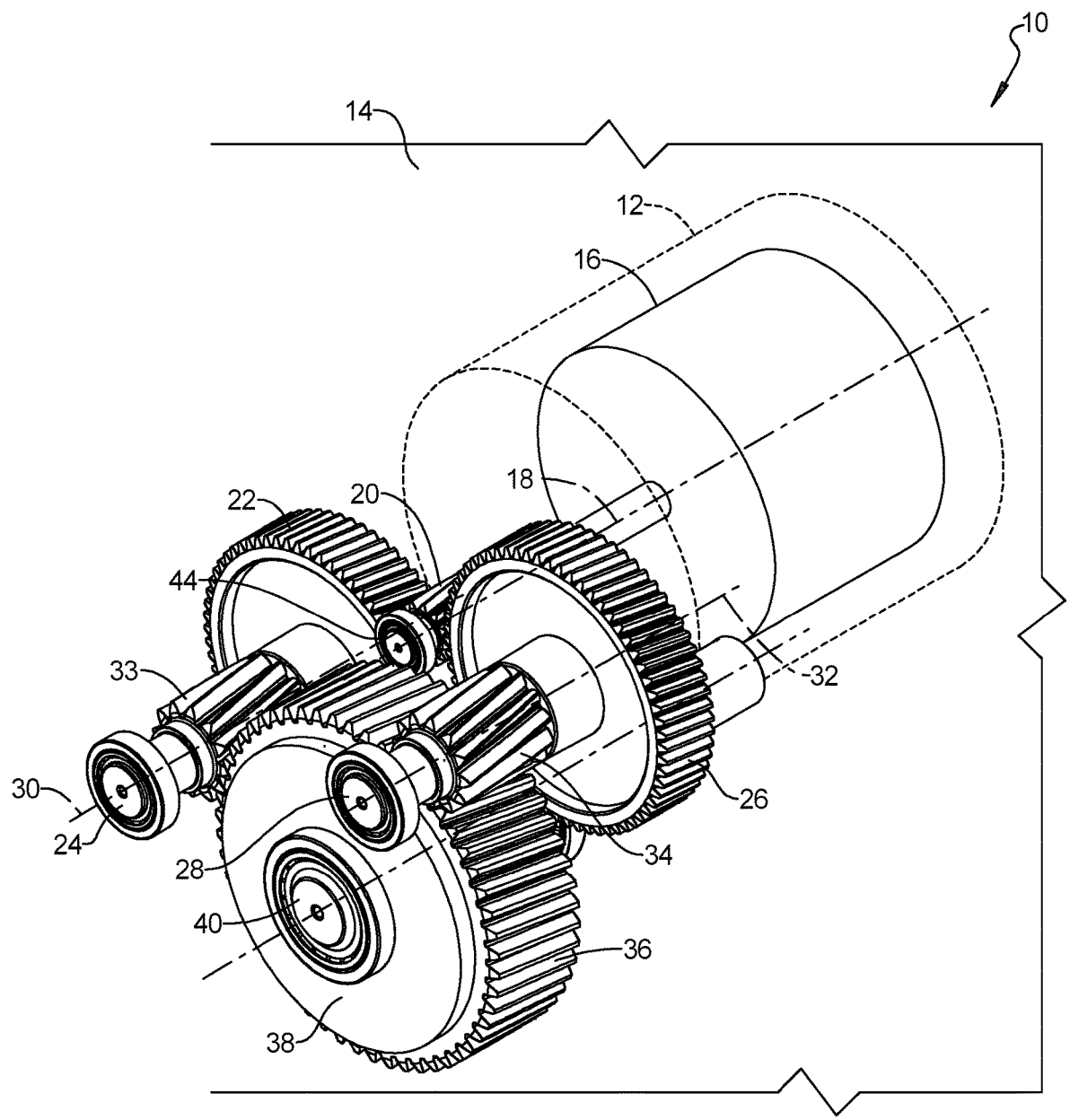
FIG. 1 is a left front perspective view of a split torque transmission according to an exemplary aspect.

Referring to FIG. 1, a split torque transmission 10 and a method for operating the split torque transmission includes a transmission housing 12, only a portion of which is shown for clarity, positioned within an automobile vehicle 14, which according to several aspects defines a battery electrical vehicle. Propulsion power is provided by an electrical motor 16 having a rotor drive shaft 18 with a drive pinion 20 attached to the rotor drive shaft 18. The drive pinion 20 is simultaneously meshed with a first transfer gear 22 mounted on a first transfer gear shaft 24 and a second transfer gear 26 mounted on a second transfer gear shaft 28. According to several aspects, a first longitudinal central axis 30 of the first transfer gear shaft 24 is oriented parallel to a second longitudinal central axis 32 of the second transfer gear shaft 28.

A first final drive pinion 33 is mounted for example by splining on the first transfer gear shaft 24 and co-rotates with the first transfer gear 22. A second final drive pinion 34 is mounted for example by splining on the second transfer gear shaft 28 and co-rotates with the second transfer gear 26. The first final drive pinion 33 and the second final drive pinion 34 are independently meshed with a differential ring gear 36 defining a final drive gear which rotates a differential assembly 38. The differential ring gear 36 is supported on a differential shaft 40.

According to several aspects the drive pinion 20, the first transfer gear 22, the second transfer gear 26, the first final drive pinion 33, the second final drive pinion 34 and the differential ring gear 36 define helical gears. Helical gears are selected to reduce transmission and gear noise and to reduce gear contact stresses and shaft bending stresses.

Shaft bending stresses (% delta needed) are improved due to split torque path of the present disclosure. Shaft bending stresses are improved for example due to load sharing. In addition, load sharing provided by use of the first transfer gear 22 and the second transfer gear 26 allows for a smaller gear module which enables higher mechanical efficiency.

Referring to FIG. 2 and again to FIG. 1, the rotor drive shaft 18 is rotatably mounted to the transmission housing 12 using a fixed first bearing 42 and a free second bearing 44 only a portion of which is visible in this view. The second transfer gear shaft 28 is rotatably supported to the transmission housing 12 using a fixed third bearing 46 and a free fourth bearing 48. The first transfer gear shaft 24 is not visible in this view and is rotatably mounted to the transmission housing 12 similarly as the second transfer gear shaft 28 using a fixed fifth bearing and a free sixth bearing. The differential shaft 40 supporting the differential ring gear 36 is rotatably mounted to the transmission housing 12 using a fixed seventh bearing 50 and a free eighth bearing 52. It is noted that each of the fixed-free bearing arrangements identified above may also be fixed-fixed bearing arrangements within the scope of the present disclosure.

Figure 2:
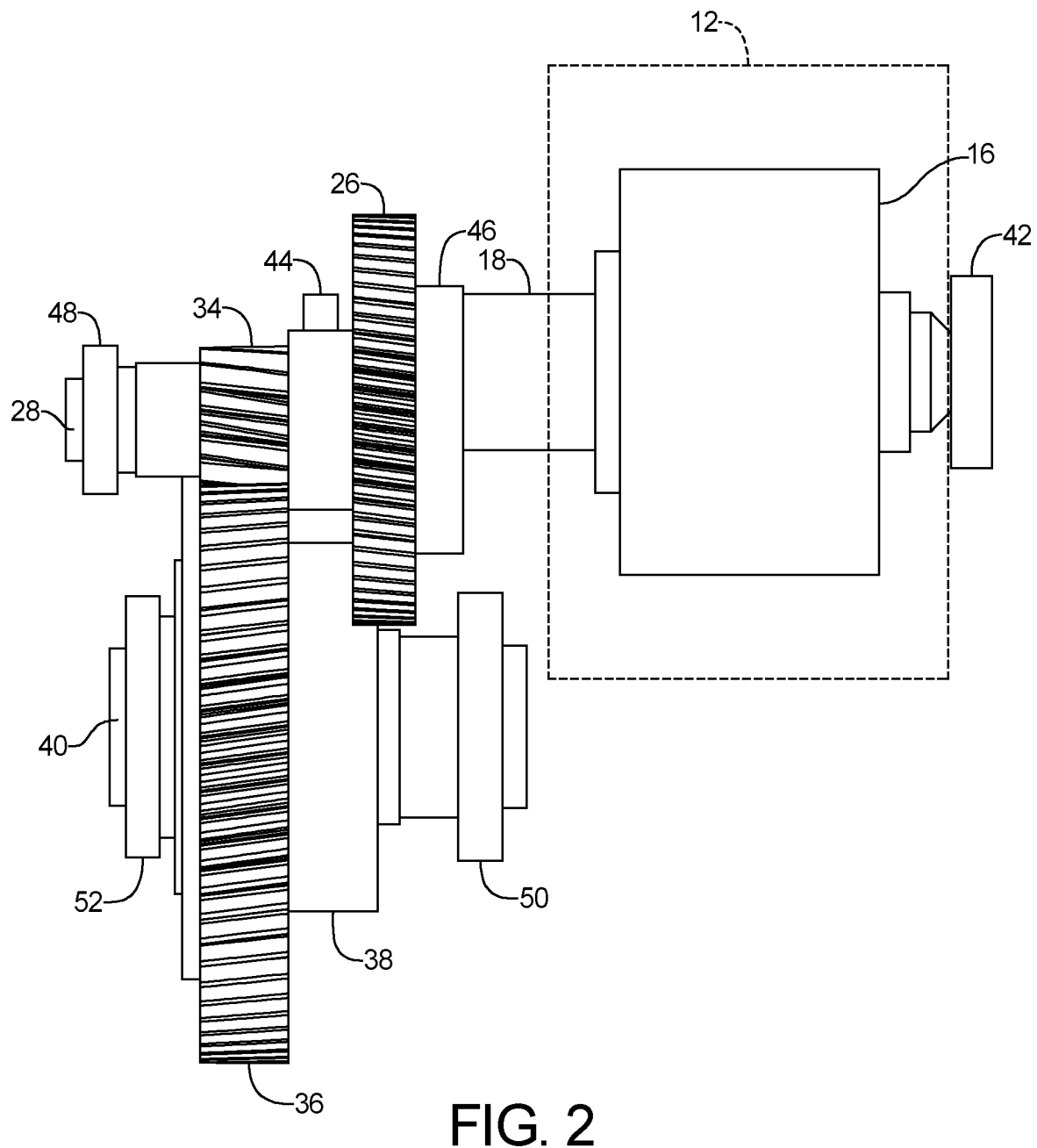
FIG. 2 is a front elevational view of the split torque transmission of FIG. 1.
Figure 6:
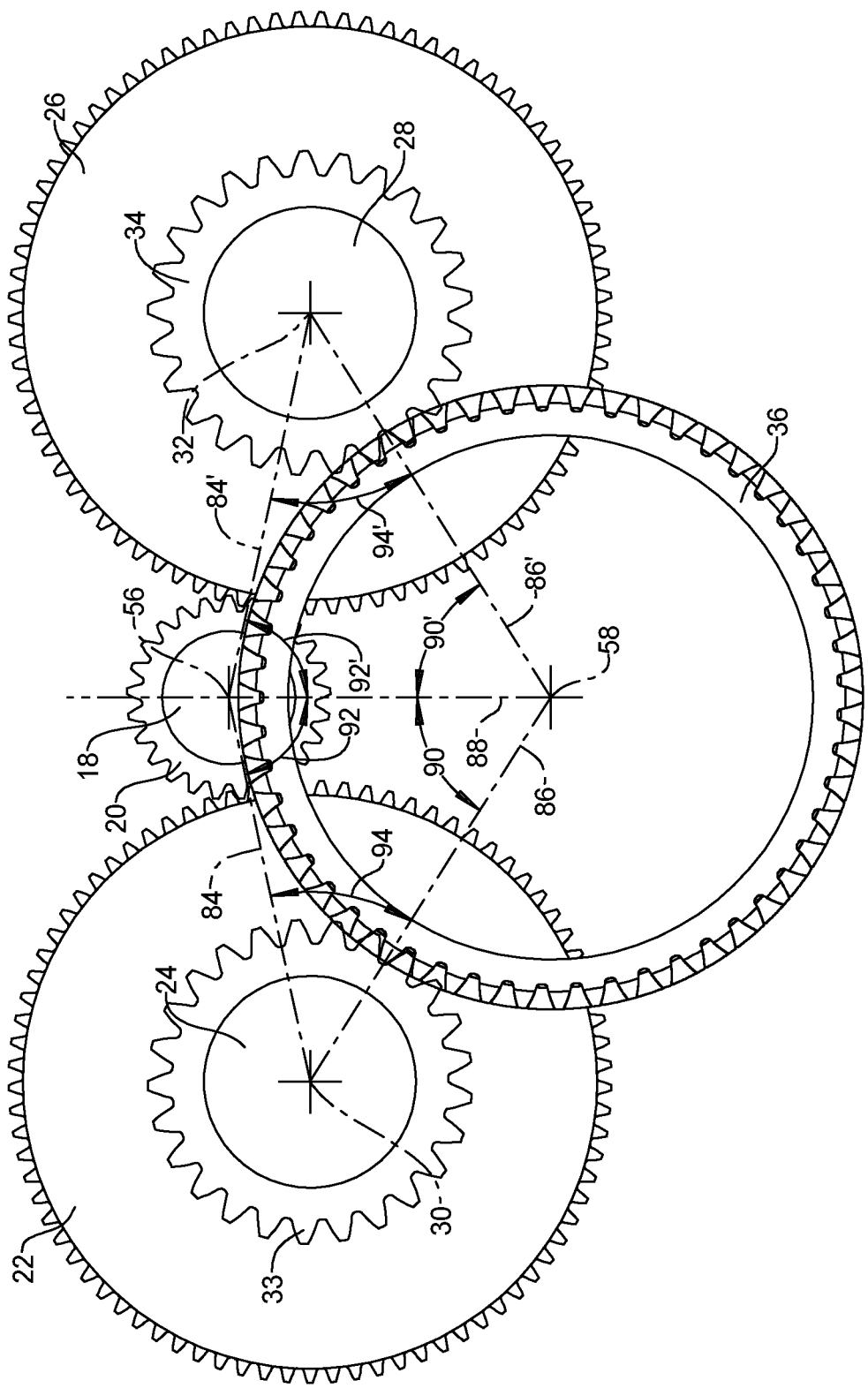
FIG. 6 is an end elevational view of a meshed 4-axis gear set for the transmission of FIG. 1.

Referring to FIG. 3 and again to FIG. 2, an input-output axis 54 is defined between a drive shaft longitudinal axis 56 of the rotor drive shaft 18 and a differential longitudinal axis 58 of the differential shaft 40. An alpha angle, a beta angle and a gamma angle described below in reference to FIG. 6 may be varied to change a first spacing defined between the second axis and the third axis; and a second spacing defined between the first axis and the fourth axis The design transfer axes location of the transmission housing 12, the transfer gear pair teeth, and the final drive ring gear pair teeth all mesh while maintaining symmetry along the input-output axis 54. The first longitudinal central axis 30 and the second longitudinal central axis 32 are aligned on a plane 60 which is oriented transverse to the input-output axis 54.

Figure 3:
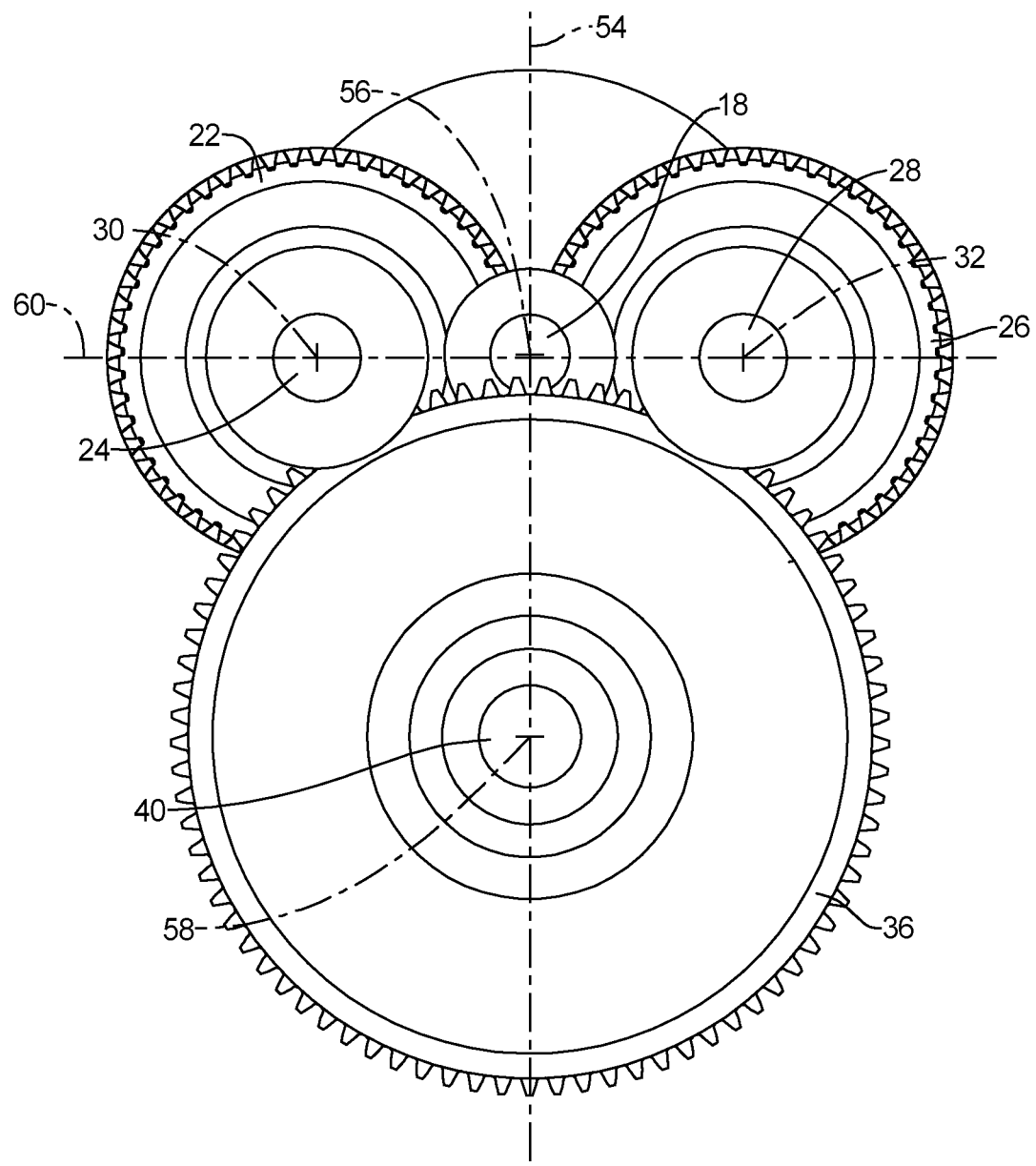
FIG. 3 is an end elevational view of the split torque transmission of FIG. 1.
Figure 4A:
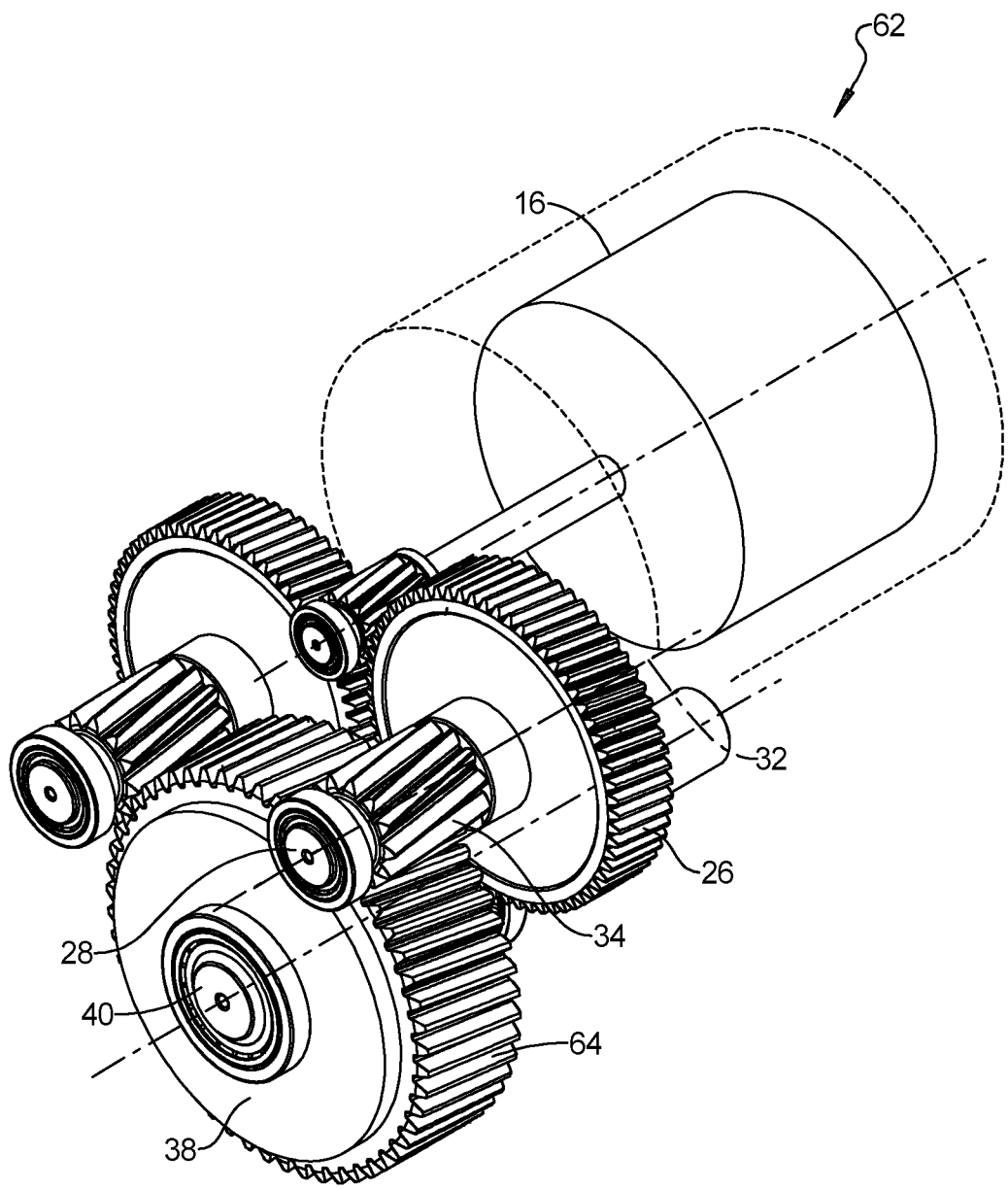
FIG. 4A is a left front perspective view of a transmission modified from the transmission of FIG. 1.
Figure 4B:
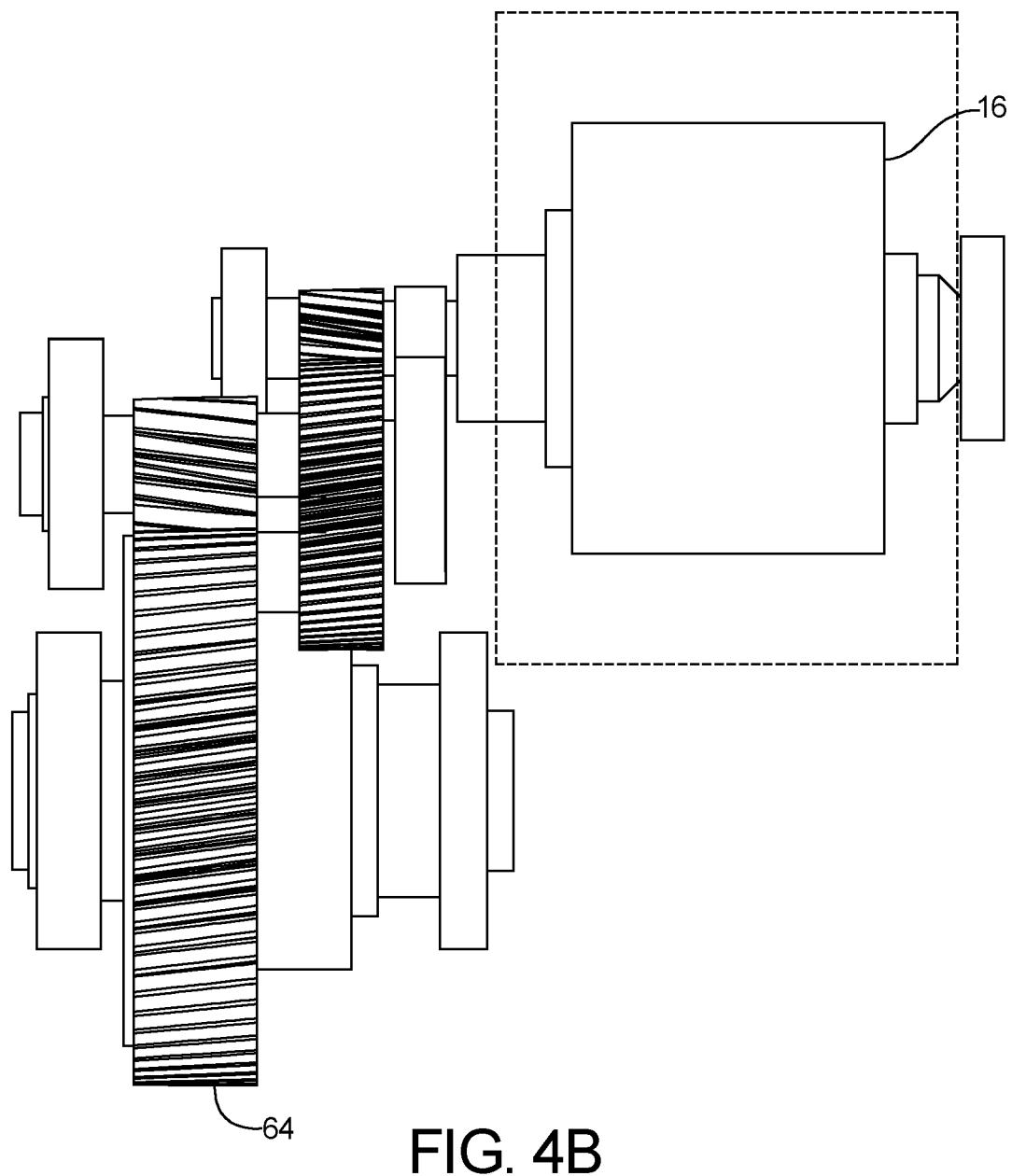
FIG. 4B is a front elevational view of a transmission modified from the transmission of FIG. 2.
Figure 4C:
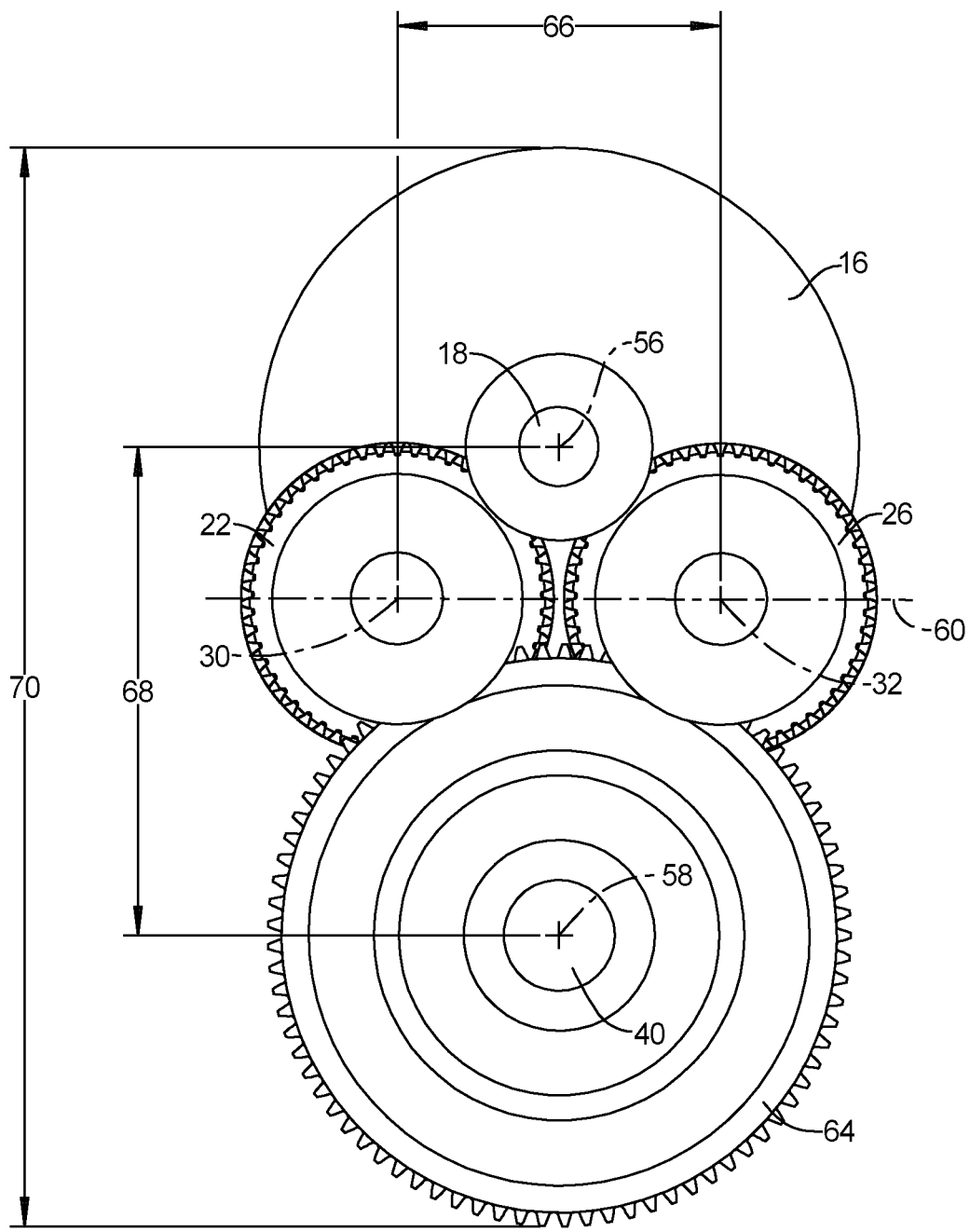
FIG. 4C is an end elevational view of a transmission modified from the transmission of FIG. 3.

Referring to FIGS. 4A, 4B, 4C and again to FIGS. 2 and 3, a split torque transmission 62 is modified from the split torque transmission 10 to decrease a diameter of a differential ring gear 64 which replaces the differential ring gear 36. With specific reference to FIG. 4C, a horizontal spacing 66 between the first longitudinal central axis 30 and the second longitudinal central axis 32 is decreased compared to a comparable horizontal spacing of the split torque transmission 10, providing a vertical spacing 68 between the plane 60 and the differential longitudinal axis 58 of the differential shaft 40 which is less than a comparable vertical spacing of the split torque transmission 10. A total height 70 of the split torque transmission 62 is therefore greater than a total height of the split torque transmission 10. It is also noted as the differential ring gear size gets smaller, the total height 70 of the split torque transmission 10 is also reduced.

Figure 5A:
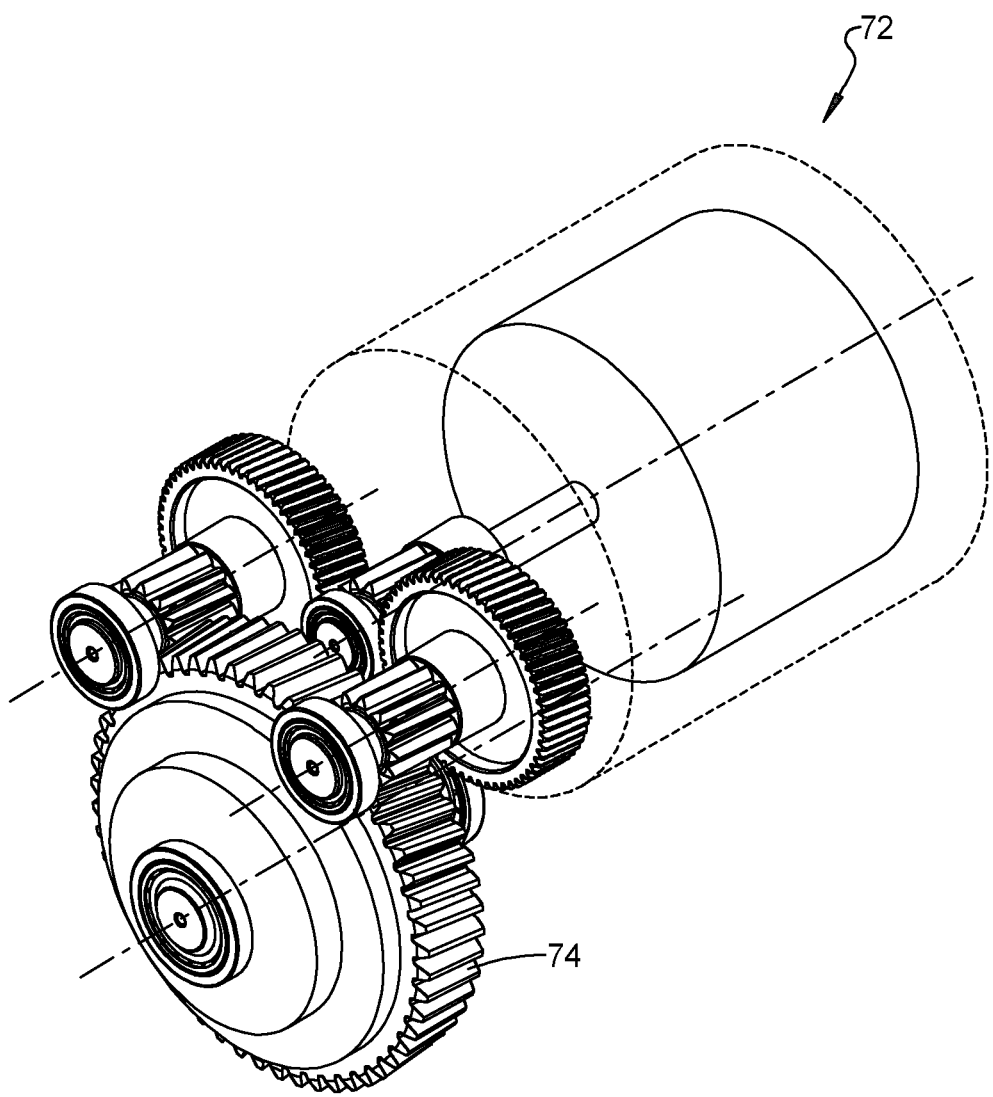
FIG. 5A is a left front perspective view of a transmission modified from the transmission of FIG. 1.
Figure 5B:
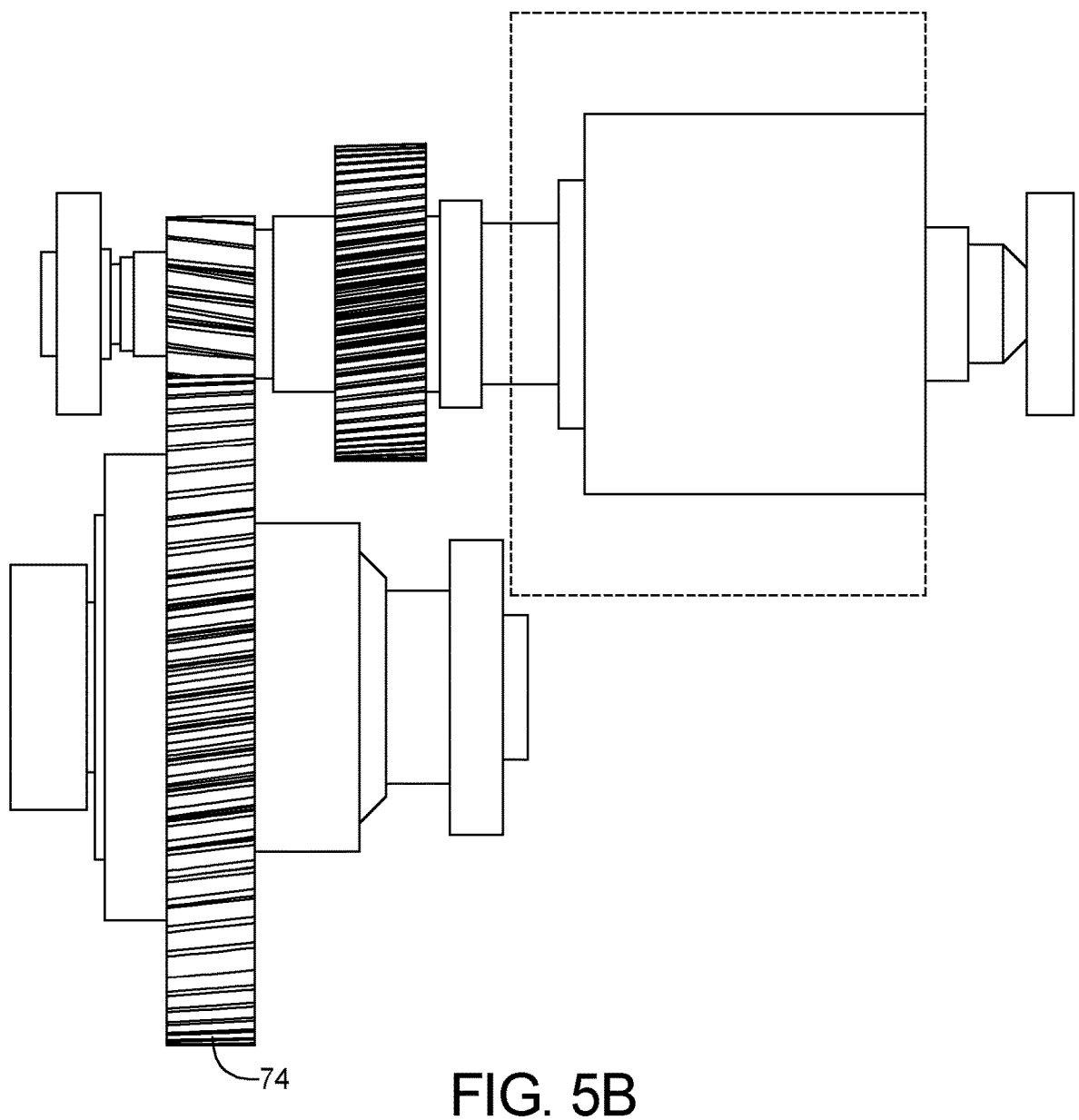
FIG. 5B is a front elevational view of a transmission modified from the transmission of FIG. 2.
Figure 5C:
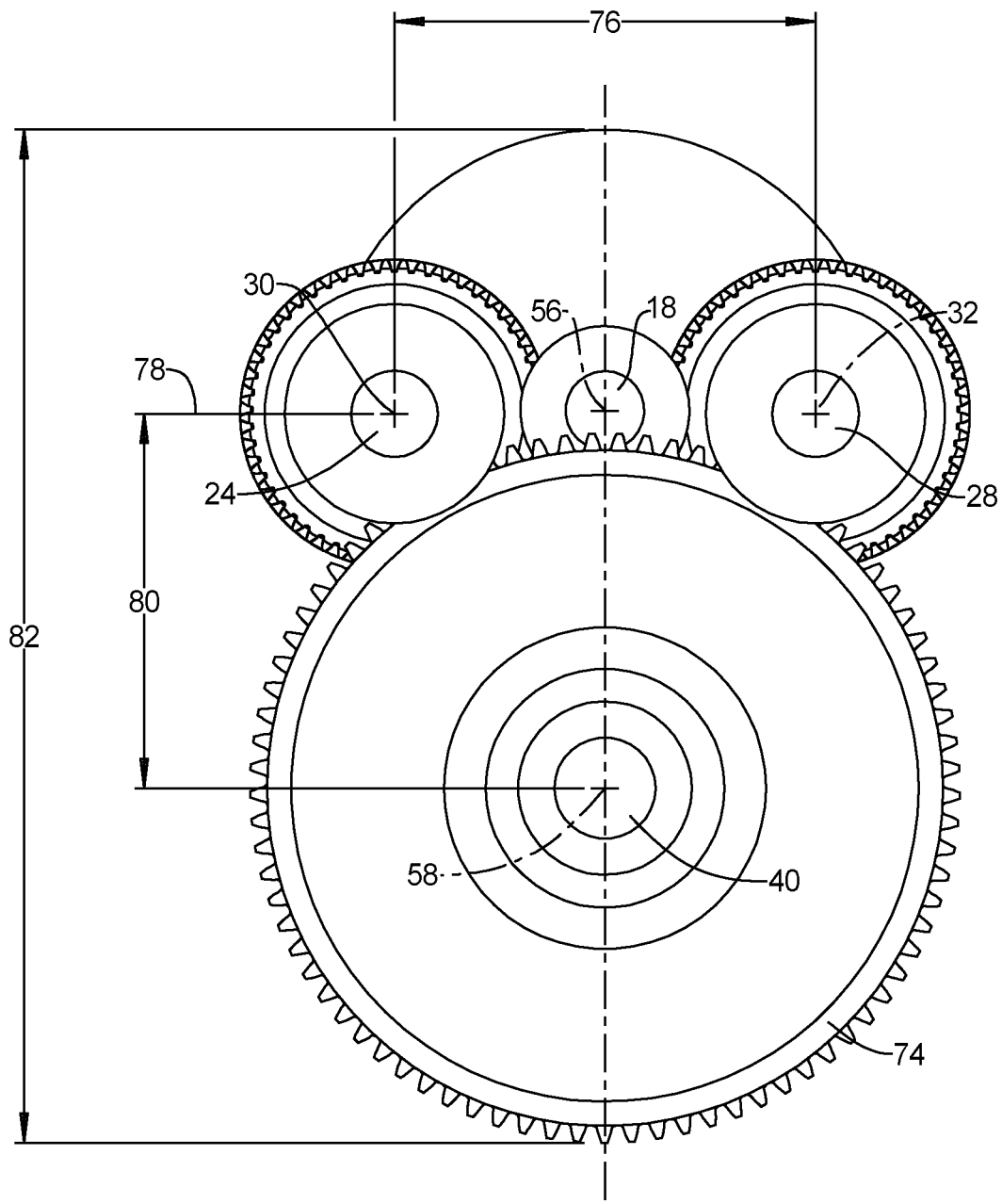
FIG. 5C is an end elevational view of a transmission modified from the transmission of FIG. 3.

Referring to FIGS. 5A, 5B, 5C and again to FIGS. 1 through 4, a split torque transmission 72 is modified from the split torque transmission 62 to increase a diameter of a differential ring gear 74 which replaces the differential ring gear 64. With specific reference to FIG. 5C, a horizontal spacing 76 between the first longitudinal central axis 30 and the second longitudinal central axis 32 is increased compared to the horizontal spacing 66 of the split torque transmission 62. The drive shaft longitudinal axis 56 of the rotor drive shaft 18 is thereby lowered to approach a plane 78 extending through the first longitudinal central axis 30 and the second longitudinal central axis 32. A vertical spacing 80 between the plane 78 and the differential longitudinal axis 58 of the differential shaft 40 is thereby less than the vertical spacing 68 of the split torque transmission 62. A total height 82 of the split torque transmission 72 is therefore less than the total height 70 of the split torque transmission 62. It is further noted the configuration of FIG. 5C having the drive shaft longitudinal axis 56 of the rotor drive shaft 18 lowered to approach the plane 78 substantially cancels radial loading of the first transfer gear shaft 24 and the second transfer gear shaft 28. A maximum load cancellation, the lowest shaft bending stresses and a minimum rotor air gap are also provided due to minimum shaft deflection when the drive pinion 20 is at its closest approach to the plane 60 defining the first transfer gear axis and the second transfer gear axis.

Referring to FIG. 6 and again to FIGS. 1 through 5, angular and distance geometries of the components of the split torque transmission 10 are presented, which are also applicable to the angular geometries of the split torque transmission 62 and the split torque transmission 72. Distance segments of equal length are assigned the same number. For example a distance segment 84 and a distance segment 84' are equal length segments defining respectively a distance between the first longitudinal central axis 30 and the drive shaft longitudinal axis 56 of the rotor drive shaft 18 and between the second longitudinal central axis 32 and the drive shaft longitudinal axis 56 of the rotor drive shaft 18. A distance segment 86 and a distance segment 86' are also equal length segments defining respectively a distance between the first longitudinal central axis 30 and the differential longitudinal axis 58 of the differential shaft 40 and between the second longitudinal central axis 32 and the differential longitudinal axis 58 of the differential shaft 40.

A chord 88 represents a distance between the drive shaft longitudinal axis 56 and the differential longitudinal axis 58 of the differential shaft 40. A first angle 90 defining an angle alpha and a second angle 90' defining an angle alpha prime are equal angles defining respectively an angle between the distance segment 86 and the chord 88, and between the distance segment 86' and the chord 88. A third angle 92 defining an angle beta and a fourth angle 92' defining an angle beta prime are equal angles defining respectively an angle between the distance segment 84 and the chord 88, and between the distance segment 84' and the chord 88. A fifth angle 94 defining an angle gamma and a sixth angle 94' defining an angle gamma prime are equal angles defining respectively an angle between the distance segment 84 and the distance segment 86, and between the distance segment 84' and the distance segment 86'. For examples of Alpha, Beta, and Gamma angles of transmission designs of the present disclosure having different overall ratios (OARs), see Table 1 below. For examples of transmission designs of the present disclosure of the 17.5 OAR design, see Table 2 below. It is noted CD1 and CD2 represent the distance segments 84, 84' and the chords 86, 86' presented in FIG. 6.

TABLE 1

| OAR | Alpha, Deg | Beta, Deg | Gamma, Deg | CD1 | CD2 | CD_IPOP |
|---|---|---|---|---|---|---|
| 15.9 | 35.425 | 74.896 | 69.679 | 78.5 | 103.75 | 127 |
| 17.5 | 35.425 | 74.896 | 69.679 | 78.5 | 130.75 | 127 |
| 23.8 | 35.425 | 74.896 | 69.679 | 78.5 | 130.75 | 127 |

TABLE 2

| 100% Drive Load, OAR17.5 Design | | | |
|---|---|---|---|
| gamma, Deg | CD_IPOP | Drive Load Sharing % error | Drive Load, MLOA (mRad) |
| 61 | 129.3 | 4.9% | 0.368 |
| 60 | 127.5 | 4.5% | 0.348 |
| 59 | 126.1 | 4.4% | 0.328 |
| 58 | 124.5 | 4.3% | 0.316 |
| 57 | 122.9 | 4.0% | 0.302 |
| 56 | 121.2 | 3.8% | 0.283 |
| 53 | 116.2 | 3.4% | 0.295 |
| 50 | 111.5 | 2.9% | 0.263 |

Note:
when the Gamma angle is equal to or greater than 50-degrees, the rotor drive pinion axis is the same or near the transfer axis height.

Figure 7:
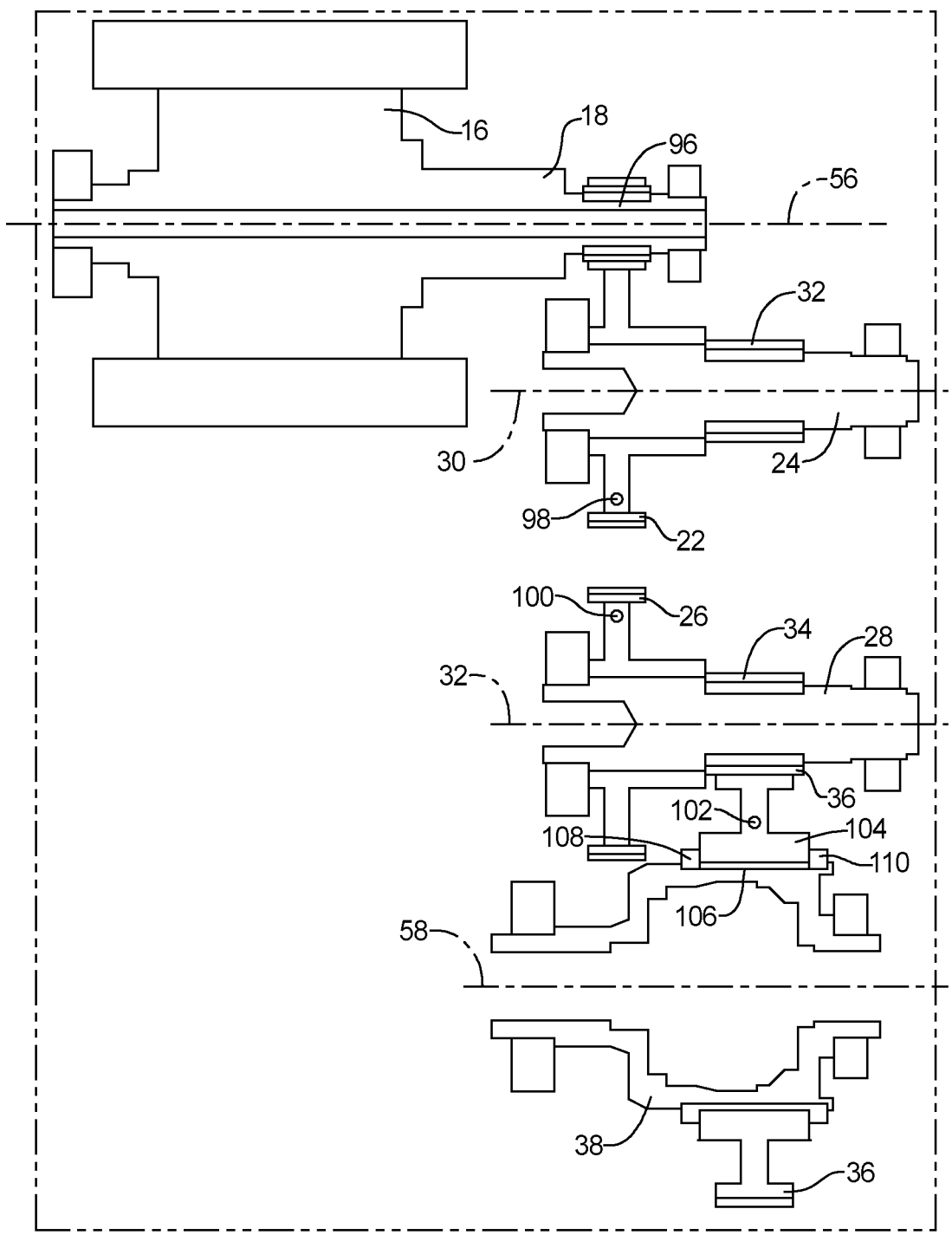
FIG. 7 is an opened cross-sectional plan view of the transmission of FIG. 1.

Referring to FIG. 7 and again to FIGS. 1 through 6, an output torque of the split torque transmission designs of the present disclosure may be determined as follows. An input torque 96 for example 1 Nm is delivered by the rotor drive shaft 18 along the drive shaft longitudinal axis 56 to the first transfer gear 22 connected to the first transfer gear shaft 24. The first transfer gear 22 rotating with respect to the first longitudinal central axis 30 transfers a first split torque 98 defining one half of the input torque 96 or ½ Nm multiplied by a stage 1 ratio during rotation with respect to the second transfer gear 26. The first transfer gear 22 meshes with the drive pinion 20, and the second transfer gear 26 also meshes with the drive pinion 20. The second transfer gear 26 rotates with respect to the second longitudinal central axis 32 and transfers a second split torque 100 defining one half of the input torque 96 or ½ Nm multiplied by the stage 1 ratio during rotation with respect to the second transfer gear 26.

An output torque 102 delivered to the differential assembly 38 is transferred by rotation of the first transfer gear 22 which co-rotates the first final drive pinion 33, and the second transfer gear 26 which co-rotates the second final drive pinion 34, the first final drive pinion 33 and the second final drive pinion 34 meshed with the differential ring gear 36. According to several aspects Equation 1 below may be used to define the output torque as follows:

output torque 102=[(first split torque 98×a stage 1 ratio)×(a stage 2 ratio)]+[(second split torque 100×the stage 1 ratio)×(the stage 2 ratio)].    Equation 1:

According to several aspects, the differential ring gear 36 is provided with an I-beam-shaped body 104. The I-beam-shaped body 104 is connected to the differential assembly 38 using a spline 106, which reduces stresses between the differential assembly 38 and the differential ring gear 36 compared to fastener connection of these components which is commonly used. The spline is held in position using a keeper 108 at a first end and a retention element 110 such as a spring pin on an outside or second end.

A split torque transmission of the present disclosure provides an architecture having four parallel axes, with a split torque power flow which may be used with various design arrangement options for electrical vehicle drive units' gear, shaft, bearing, and structural arrangements. Load sharing is enabled to parallel shaft arrangement and overcomes the challenge of minimizing load sharing error for electrical vehicle drive units.

A split torque transmission of the present disclosure enables achieving a higher overall ratio (OAR) while having minimum growth in gear and bearing sizes. The OAR for the split torque transmissions of the present disclosure may be defined as a speed of an input axis which according to several aspects is equal to a speed of the drive shaft longitudinal axis 56 of the rotor drive shaft 18 versus a speed of an output axis which according to several aspects is equal to a speed of the differential longitudinal axis 58 of the differential shaft 40.

A split torque transmission of the present disclosure provides high power density and wide OAR 15~24 coverage (20 krpm~30 krpm motor speed) with helical gears and multiple different helix hand combinations. The different helix hand combinations include: 1) a first pinion helix hand with a left helix hand stage 1 and a right helix hand stage 2; 2) a second pinion helix hand with a left helix hand stage 1 and a left helix hand stage 2; 3) a third pinion helix hand with a right helix hand stage 1 and a right helix hand stage 2; and 4) a fourth pinion helix hand with a right helix hand stage 1 and a left helix hand stage 2.

A split torque transmission of the present disclosure enables better drive unit performance with smaller sizes. These include reductions in contact stress, final drive ring gear outside diameter, reduced transfer gear misalignment, transfer gear peak-to-peak TE, and FD peak-to-peak TE. For example, see table 3 below where OWL designates a transmission of the present disclosure:

TABLE 3

| | Out & Out (Baseline) | OWL | % Reduction |
|---|---|---|---|
| OAR | 17.4 | 17.5 | — |
| Output Torque, Nm | 7033 | 7090 | — |
| Transfer Gear Misalignment, mRad | 1.17 | 0.35 | 70% |
| Transfer Gear Peak to Peak TE, um | 3.6 | 2.5 | 31% |
| Transfer Gear Shaft Bending Stress, Mpa | 160 @44 mm dia | 71 @41 mm | 56% |
| Final Drive Ring Gear Normal Module | 2.29 | 1.78 | 22% |
| Final Drive Ring Gear OD, mm | 300.7 | 244.0 | 19% |
| Final Drive Ring Gear FW, mm | 54 | 45 | 17% |
| Final Drive Ring Gear Contact Stress, Mpa | 4539 | 2856 | 37% |
| Final Drive Ring Gear Peak to Peak TE, um | 6.8 | 2.1 | 69% |

A transmission design of the present disclosure provides a lower motor pinion gear pitch line velocity (PLV) at 20 krpm~30 krpm compared to known single speed ratio transmissions. For example, at a motor speed of 20,000 rpm the pitch line velocity (PLV) is approximately 32.6 meters per second. At a motor speed of 30,000 rpm the PLV is approximately 49 meters per second.

A split torque transmission of the present disclosure provides fixed-free bearing arrangements and a fixed-fixed option. A split torque transmission of the present disclosure provides various locations of a final drive pinion gear pair axial location in relationship to a motor pinion gear pair axial location.

A split torque transmission of the present disclosure enables load sharing to a parallel shaft arrangement and overcomes the challenge of minimizing load sharing error for battery electrical vehicle drive unit applications.

For a split torque transmission of the present disclosure the design transfer axes location of the transmission, the alpha angle, the beta angle and the gamma angle may vary, with the transfer gear pair teeth, and the final drive ring gear pair teeth all meshing while maintaining symmetry along the input-output axis.

A split torque transmission of the present disclosure achieves <4.5% load sharing error at 7090 Nm output torque.

The motor pinion gear may be integrated or splined onto the rotor shaft with a combination of a bearing supporting the gear load (i.e. 3-bearing design.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle split torque transmission, comprising:
    an electrical motor having a rotor drive shaft with a drive pinion attached to the rotor drive shaft, the rotor drive shaft defining a first axis;
    a first transfer gear mounted on a first transfer gear shaft defining a second axis, the first transfer gear meshed with the drive pinion;
    a second transfer gear mounted on a second transfer gear shaft defining a third axis, the second transfer gear meshed with the drive pinion;
    a differential ring gear supported on a differential shaft and rotating a differential assembly, the differential shaft defining a fourth axis;
    a first bearing supporting the rotor drive shaft;
    a second bearing supporting the rotor drive shaft;
    a third bearing supporting the first transfer gear shaft;
    a fourth bearing supporting the first transfer gear shaft;
    a fifth bearing supporting the second transfer gear shaft; and
    a sixth bearing supporting the second transfer gear shaft, wherein the first bearing, the third bearing and the fifth bearing define free bearings, and wherein the second bearing, the fourth bearing and the sixth bearing define fixed bearings.

2. The automobile vehicle split torque transmission of claim 1, further including a first final drive pinion mounted on the first transfer gear shaft and co-rotating with the first transfer gear.

3. The automobile vehicle split torque transmission of claim 2, further including a second final drive pinion mounted on the second transfer gear shaft and co-rotating with the second transfer gear.

4. The automobile vehicle split torque transmission of claim 3, wherein the first final drive pinion and the second final drive pinion are independently meshed with the differential ring gear defining a final drive gear which rotates the differential assembly.

5. The automobile vehicle split torque transmission of claim 3, wherein the drive pinion, the first transfer gear, the second transfer gear, the first final drive pinion, the second final drive pinion and the differential ring gear define helical gears.

6. The automobile vehicle split torque transmission of claim 1, further including:
   a first spacing defined between the second axis and the third axis; and
   a second spacing defined between the first axis and the fourth axis; and
   wherein a total height of the split torque transmission is varied by one of:
      increasing the first spacing and decreasing the second spacing; or
      decreasing the first spacing and increasing the second spacing.

7. The automobile vehicle split torque transmission of claim 1, wherein the second axis is oriented parallel to the third axis.

8. An automobile vehicle split torque transmission, comprising:
   an electrical motor having a rotor drive shaft;
   a drive pinion attached to the rotor drive shaft;
   a first transfer gear mounted on a first transfer gear shaft, the first transfer gear meshed with the drive pinion;
   a second transfer gear mounted on a second transfer gear shaft defining a third axis, the second transfer gear meshed with the drive pinion;
   a first final drive pinion mounted on the first transfer gear shaft and co-rotating with the first transfer gear;
   a second final drive pinion mounted on the second transfer gear shaft and co-rotating with the second transfer gear; and
   a differential ring gear supported on a differential shaft,
   wherein the first final drive pinion and the second final drive pinion are independently meshed with the differential ring gear defining a final drive gear rotating a differential assembly and a spline connects an I-beam-shaped body of the differential ring gear to the differential assembly.

9. The automobile vehicle split torque transmission of claim 8, wherein:
   the rotor drive shaft defines a first axis;
   the first transfer gear shaft defines a second axis;
   the second transfer gear shaft defines a third axis; and
   the differential shaft defines a fourth axis; and
   wherein the second axis is positioned on a plane and the third axis is positioned on the plane, with the second axis oriented parallel to the third axis.

10. The automobile vehicle split torque transmission of claim 9,
    wherein the first axis, the second axis and the third axis are commonly positioned on a plane extending through a longitudinal central axis of the rotor drive shaft, a longitudinal central axis of the first transfer gear shaft and a longitudinal central axis of the second transfer gear shaft; and
    wherein when the first axis, the second axis and the third axis are commonly positioned on the plane extending through the longitudinal central axis of the rotor drive shaft a radial loading of the first transfer gear shaft and the second transfer gear shaft are substantially canceled, and a maximum load cancellation, a lowest shaft bending stress and a minimum rotor air gap are also provided.

11. The automobile vehicle split torque transmission of claim 9, further including:
    a first distance segment and a second distance segment being equal length segments, the first distance segment defining a distance between a longitudinal central axis of the first transfer gear shaft and a longitudinal central axis of the rotor drive shaft, with the second distance segment defining a distance between a longitudinal central axis of the second transfer gear shaft and the longitudinal central axis of the rotor drive shaft; and
    a third distance segment and a fourth distance segment being equal length segments, the third distance segment defining a distance between a longitudinal central axis of the differential shaft and a longitudinal central axis of the first transfer gear shaft, with the fourth distance segment defining a distance between the longitudinal central axis of the differential shaft and a longitudinal central axis of the second transfer gear shaft.

12. The automobile vehicle split torque transmission of claim 9, wherein the rotor drive shaft, the first transfer gear shaft, the second transfer gear shaft and the differential shaft are independently supported from a transmission housing using a first bearing and a second bearing, one of the first bearing or the second bearing defining a fixed bearing and the other one of the first bearing or the second bearing defining a free bearing.

13. The automobile vehicle split torque transmission of claim 9, wherein the drive pinion, the first transfer gear, the second transfer gear, the first final drive pinion, the second final drive pinion and the differential ring gear define helical gears.

\* \* \* \* \*